(12) United States Patent
Drobot

(10) Patent No.: US 6,237,975 B1
(45) Date of Patent: May 29, 2001

(54) SNOW SHOVEL

(76) Inventor: Alan J Drobot, 449 Trent Avenue, Winnipeg, Manitoba (CA), R2K 1G1

( * ) Notice: Subject to any disclaimer, the term of this patent is extended or adjusted under 35 U.S.C. 154(b) by 0 days.

(21) Appl. No.: 09/539,705

(22) Filed: Mar. 31, 2000

(51) Int. Cl.[7] .................................. A01B 1/02; E01H 5/02
(52) U.S. Cl. .......................... 294/57; 254/131.5; 294/54.5
(58) Field of Search ........................... 294/49, 51, 54.5, 294/57–59; 37/265, 284, 285; 172/371, 378, 381; 254/131.5, 132

(56) References Cited

U.S. PATENT DOCUMENTS

| | | | |
|---|---|---|---|
| 445,621 | * | 2/1891 | Kretsinger .......................... 254/131.5 |
| 545,536 | * | 9/1895 | Russell ................................ 254/131.5 |
| 1,007,656 | * | 10/1911 | Fox ........................................ 254/132 |
| 2,121,265 | * | 6/1938 | Ruffcorn ................................ 254/132 |
| 2,373,898 | * | 4/1945 | Kulesh .................................. 254/132 |
| 3,343,807 | * | 9/1967 | Moraski ............................ 294/54.5 X |
| 4,130,953 | | 12/1978 | Bruno . |
| 4,198,090 | | 4/1980 | Gutman . |
| 5,487,530 | | 1/1996 | Mccullough . |
| 5,511,327 | | 4/1996 | Jurkowski et al. . |
| 5,918,921 | | 7/1999 | Samuelson . |

FOREIGN PATENT DOCUMENTS

| | | | |
|---|---|---|---|
| 81309 | * | 7/1963 | (FR) ...................................... 294/57 |
| 1407731 | * | 6/1965 | (FR) ...................................... 294/57 |
| 95/03923 | * | 2/1995 | (WO) ..................................... 294/57 |

* cited by examiner

*Primary Examiner*—Johnny D. Cherry
(74) *Attorney, Agent, or Firm*—Adrian D. Battison; Michael R. Williams

(57) ABSTRACT

According to the present invention there is provided a shovel comprising an elongate body, a handle at an end of the body, a digging end at a respective end of the body which is arranged to move material and a bent portion on the body adjacent the digging end. The bent portion is formed such that an engaging end is arranged to engage a ground surface creating a fulcrum affect when the handle is forced downwards by a user thereby tilting the digging end off the ground surface. The bent portion is generally U-shaped having a first bend at the digging end which extends downwards therefrom, a second bend which extends upwards and a third bend which extends rearwards generally longitudinally with the digging end. The second bend has a larger radius than the first and third bends defining a rounded rolling surface such that a contact point of the fulcrum is varied longitudinally as the shovel is tilted. The shovel body is formed from a single elongate tube.

1 Claim, 2 Drawing Sheets

SNOW SHOVEL

FIELD OF THE INVENTION

The present invention relates to a snow shovel.

BACKGROUND

Conventional shovels are used to move articles such as snow and the like. It is known that shovels can be altered in ways to provide an easier method of shovelling. Some examples of these alternate methods or devices are shown in U.S. Pat. No. 5,918,921 (Gutman), U.S. Pat. No. 4,198,090 (Bruno), U.S. Pat. No. 5,511,327 (Jurkowski et al), U.S. Pat. NO. 4,130,953 (Samuelson) and U.S. Pat. No. 5,487,530 (McCullough).

U.S. Pat. No. 4,198,090 discloses a conventional shovel which has an adjustable lever mechanism and an adjustable grip mechanism. The lever mechanism is arranged such that a user would shovel an amount of snow and then engage an end of the lever onto a ground surface and pull rearwards on the grip to lift the snow.

U.S. Pat. No. 4,130,953 provides a shovel which is pivotally mounted on a sled which allows the shovel blade or bucket to be scraped along the ground and can be tilted upwards on the pivot for lifting of the ground.

U.S. Pat. No. 5,511,327 is a wheeled shovel which has a wheel mounted on a frame adapted to fit onto a conventional handle.

U.S. Pat. No. 5,918,921 is a conventional shovel with a wheel arm extending from a handle in a perpendicular manner, the shovel is arranged to be scraped across the ground as the wheel is placed on the end of the wheel arm providing leverage for the handle.

U.S. Pat. No. 5,487,530 provides a shovel with an elongate bracing member releasably attached to the handle allowing a user to use the handles as a lever for lifting the snow.

None of the above patents mentioned provide a shovel with a simple leverage portion which would allow a user to use the shovel in the conventional way or use the shovel in a novel way with a fulcrum.

SUMMARY

The present invention is arranged to provide a shovel which has a fulcrum to enable people with back problem and/or elderly people to perform the task of shovelling snow without having to manually lift the shovel. The present invention is a shovel which has a bent portion such that a user can use the bent portion as a fulcrum to lift an end of the shovel from a ground surface.

According to the present invention there is provided a shovel comprising;

an elongate body;

a handle at an end of the body;

a digging end at a respective end of the body which is arranged to move material; and a bent portion on the body adjacent the digging end, the bent portion is formed such that a engaging end is arranged to engage a ground surface creating a fulcrum affect when the handle is forced downwards by a user thereby tilting the digging end off the ground surface.

Preferably, the bent portion is generally U-shaped having a first bend at the digging end which extends downwards therefrom, a second bend which extends upwards and a third bend which extends rearwards generally longitudinally with the digging end.

Preferably, the second bend has a larger radius than the first and third bends defining a rounded rolling surface such that a contact point of the fulcrum is varied longitudinally as the shovel is tilted.

Preferably, the shovel body is formed from a single elongate tube.

BRIEF DESCRIPTION OF THE DRAWINGS

In the accompanying drawings, which illustrate an exemplary embodiment of the present invention.

DETAILED DESCRIPTION

Figure 1:
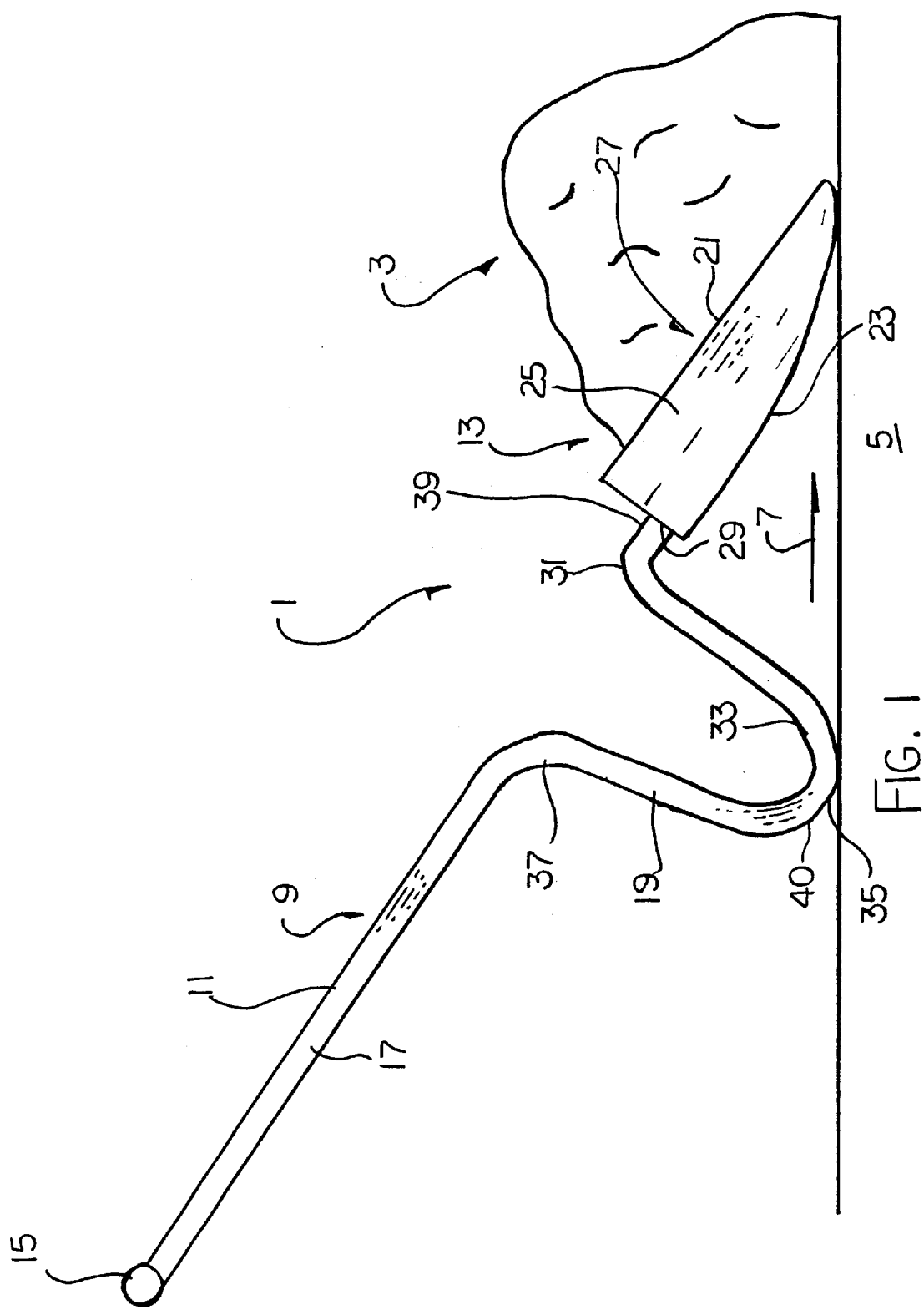
FIG. 1 is a side elevational view of the present invention.

Referring to the accompanying drawings, there is illustrated a shovel I for removing snow 3 and other such debris. The snow is located on a ground surface 5. The shovel is arranged to pick up the snow by moving in a direction of travel, as illustrated by arrow 7. The shovel has a main body 9 formed from an elongate tube 11 made of metal, wood, plastic or any sufficient material. A conventional blade 13 is located at an end of the body and a handle 15 is located at a respective end of the body. The main body has a straight portion 17 adjacent the handle and a bent portion 19 adjacent the blade.

The blade has a top side 21 and a bottom side 23 with side wall 25 extending upwards therefrom providing the top end with an open portion 27 for receiving snow and other materials. The main body has a coupled end 39 coupled to the blade at a rear side 29 of the blade. The main body extends rearwards from the blade at the bent portion. The main body has a first bend 31 which bends downwards towards the ground surface at a substantially right angle from the coupled end. A second bend 33 is located at a bottom end of the first bend defining a fulcrum 35 and then extends upwards to a third bend 37 and thereby extends rearwards longitudinally to the coupled end which is defined by the straight portion. The bent portion is substantially U shaped such that the second bend has a larger radius than that of the first and second bends defining a rounded rolling surface 40 such that the contact point of the fulcrum is varied longitudinally as the shovel is tilted.

Figure 2:
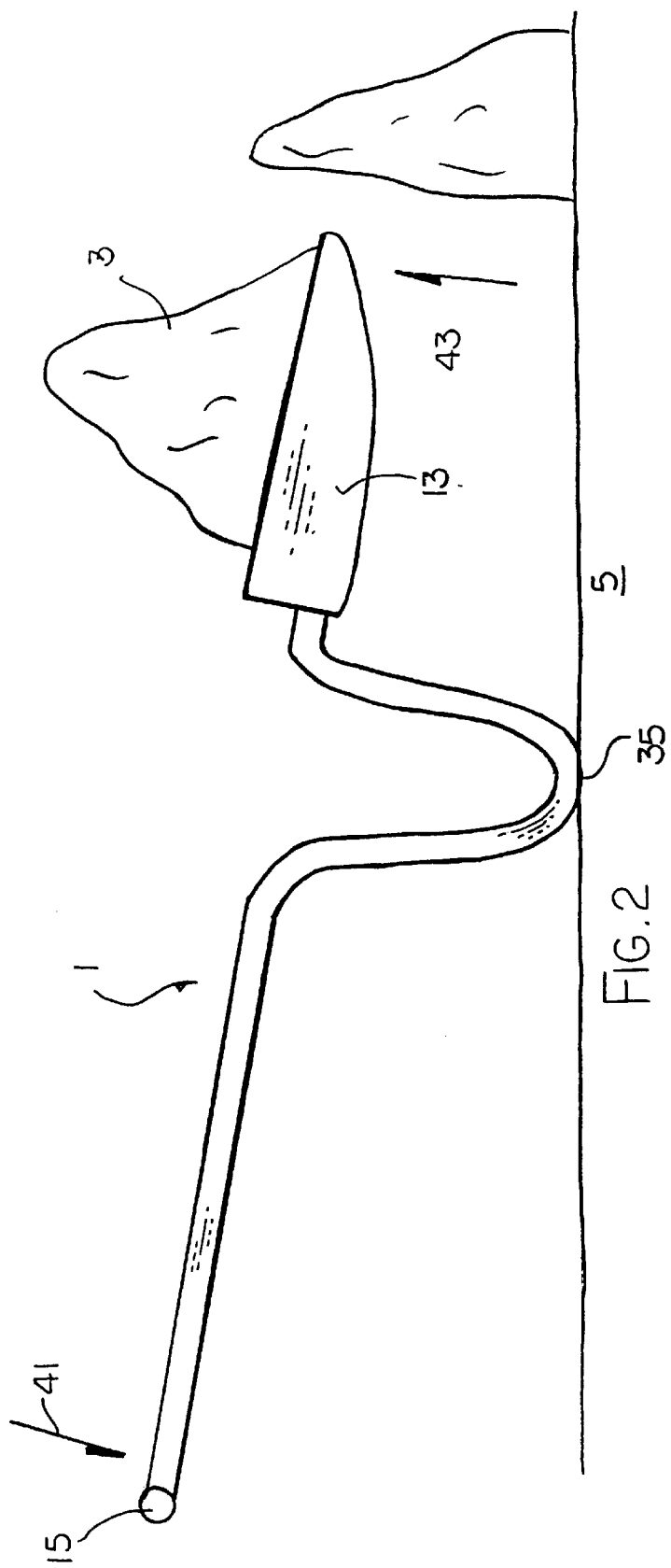
FIG. 2 is a side elevational view of the present invention showing the shovel in the lifting position.

In operation, a user pushes the shovel in the direction of travel 7 such that the blade and the bent portion engage the ground surface, in which the blade thereby engages the snow. The user then pushes downwards on the handle, as illustrated in FIG. 2 at arrow 41, such that the shovel uses the leverage provided by the fulcrum 35 to lift the blade upwards, illustrated by direction arrow 43.

The shovel is arranged to allow a user to lift the shovel with snow in the blade by using the fulcrum so that the user does not have to manually lift the snow which can cause back strain. The shovel is particularly useful for elderly people and for people with back problems that do not allow people to lift things with their back.

In an alternative embodiment, the shovel has a wheel assembly, not shown, at the second bend having wheels for movement across the ground.

In another alternative embodiment, the shovel has more than one bent portion such that the shovel has more than one fulcrum for leverage thereon.

In an alternate embodiment, the fulcrum has a sliding means which is arranged to provide a surface such that the fulcrum can be easily slide along the ground surface.

In an alternate embodiment, there is a foam or protective covering on the handle and a detachable side handle on the handle. The side handle extends outwards such that a user can grab the side handle for added leverage when lifting.

While one embodiment of the present invention has been described in the foregoing, it is to be understood that other embodiments are possible within the scope of the invention. The invention is to be considered limited solely by the scope of the appended claims.

What is claimed is:

1. A shovel comprising:
   a single elongate tubular body having;
      a straight handle portion having a handle at a rear end thereof, the handle portion extending forwardly therefrom;
      a U-shaped bent portion extending from an end of the straight handle portion the bent portion having leg and a curved base defining a fulcrum, and;
      a mounting tube portion extending from an opposite end of the bent portion relative to the handle portion, the mounting tube being directly inline with the straight handle portion;
   a shovel blade mounted to the mounting tube portion having a blade surface for lifting materials;
   The tubular body being arranged such that the only part of the elongate tubular body that contacts the ground is the curved base;
   the curved base being arranged to slide along a ground surface such that the blade scrapes materials from the ground surface and a lifting action of the blade is aided by forcing the handle downwards thereby raising the blade.

* * * * *